United States Patent [19]
Yoshida et al.

[11] Patent Number: 5,301,914
[45] Date of Patent: Apr. 12, 1994

[54] SEAT SLIDE DEVICE

[75] Inventors: Tomonori Yoshida; Moriyuki Eguchi, both of Ayase, Japan

[73] Assignee: Ikeda Bussan Co., Ltd., Ayase, Japan

[21] Appl. No.: 21,980

[22] Filed: Feb. 24, 1993

[30] Foreign Application Priority Data

Feb. 25, 1992 [JP] Japan .................. 4-17382[U]

[51] Int. Cl.$^5$ ............................................ F16M 13/00
[52] U.S. Cl. .................. 248/430; 297/344.1
[58] Field of Search ............. 248/429, 430; 296/65.1; 297/344, 452, 473

[56] References Cited

U.S. PATENT DOCUMENTS

| | | | |
|---|---|---|---|
| 119,118 | 9/1871 | Campbell | 248/429 X |
| 2,014,553 | 9/1935 | Browne | 248/430 |
| 2,278,101 | 3/1942 | Browne | 248/430 |
| 2,921,621 | 1/1960 | Williams | 248/430 X |
| 3,258,240 | 6/1966 | Kirk | 248/430 |
| 4,209,159 | 6/1980 | Becker | 297/344 X |
| 4,601,517 | 7/1986 | Heesch | 297/452 |
| 4,629,254 | 12/1986 | Stolper | 297/473 |
| 4,842,318 | 6/1989 | Fussnegger | 296/65.1 |
| 5,082,228 | 1/1992 | Shimazaki | 297/473 X |

FOREIGN PATENT DOCUMENTS 779532  7/1957  United Kingdom ............. 248/430

*Primary Examiner*—J. Franklin Foss
*Attorney, Agent, or Firm*—Foley & Lardner

[57] ABSTRACT

A seat slide device for an automotive vehicle which supports a seat to be slidably movable in the front and aft direction. The seat slide device is provided with a seat rail connected to the seat which is slidably connected with a floor rail. A bracket is integrally connected to and vertically projects and extends from the floor rail. The bracket is fittingly connected to a vehicle body with bolts. The bolts are located at a position where they are uncovered by other parts of the device, thereby enabling the easy detachment of the seat from the vehicle body.

5 Claims, 3 Drawing Sheets

SEAT SLIDE DEVICE

BACKGROUND OF THE INVENTION

1. Field of the Invention

The present invention relates to improvements in a seat slide device of an automotive vehicle.

2. Description of the Prior Art

It is well known that a seat of an automotive vehicle is slidably mounted to a vehicle body through a seat slide device. Such a seat slide device for an automotive vehicle is generally provided with a seat rail 102 connected to a seat 101 as shown in FIGS. 5 and 6. The seat rail 102 is slidably engaged with a floor rail 103 connected to the vehicle body so as to be slidably movable in the front and aft direction. With this arrangement, the seat 101 is slidably movable in the front and aft direction. An installation surface 103a of the floor rail 103 has a plurality of installation holes at predetermined intervals. The floor rail 103 is fixed to a vehicle body 105 of the automotive vehicle with a plurality of bolts 104 passing through the holes.

However, with the conventional arrangement, the positions to which the bolts 104 are screwed, are covered with the seat rail 102. Accordingly, in the situation where something with the device goes wrong, it is difficult to detach the seat 101 from the vehicle body 105. Therefore, it is a great deal of trouble to repair the device.

SUMMARY OF THE INVENTION

It is an object of the present invention to provide an improved seat slide device by which a seat is easily detached from a vehicle body in order to simplify repairs thereto.

A seat slide device according to the present invention is for an automotive vehicle and supports a seat to be slidably movable in front and aft direction. The seat slide device comprises a seat rail connected to the seat. A floor rail is slidably engaged with the seat rail. A bracket is integrally connected to the floor rail and vertically extends from the floor rail. The bracket is fittingly fixed to a vehicle body of the automotive vehicle.

With this arrangement, since the floor rail is fittingly and fixedly connected to the vehicle body through the bracket, the fixing of this device becomes further stable as compared with the conventional device. Furthermore, since the fixing portion between the bracket and the vehicle body is not covered with the seat rail or the like, the detachment of the seat becomes easy.

BRIEF DESCRIPTION OF THE DRAWINGS

In the drawings, like reference numerals designate like parts and elements throughout all figures, in which.

DETAILED DESCRIPTION OF THE INVENTION

Figure 1:
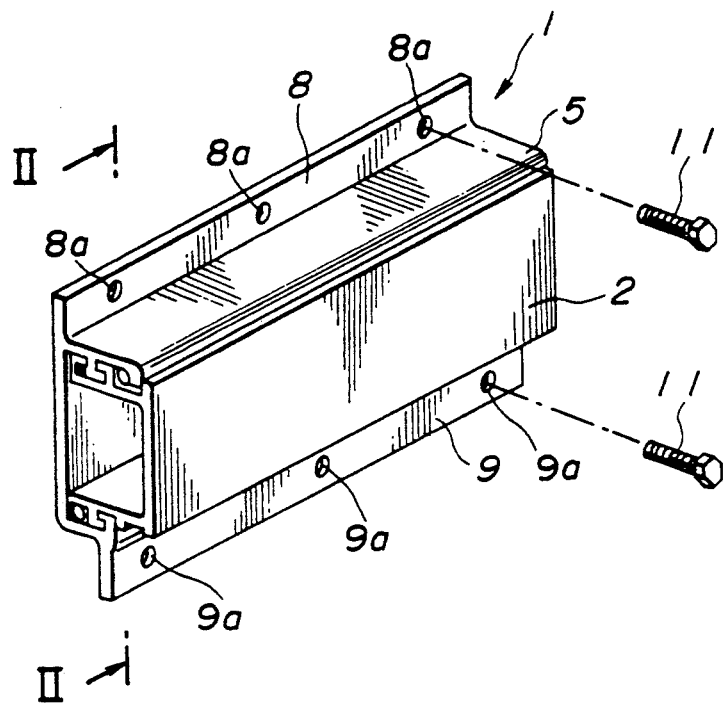
FIG. 1 is a perspective view of a first embodiment of a seat slide device according to the present invention.
Figure 2:
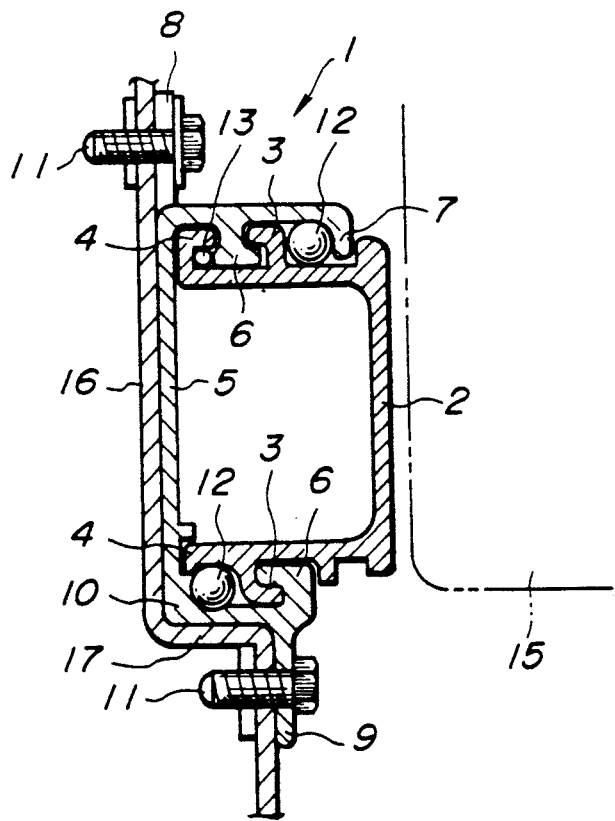
FIG. 2 is a cross-sectional view taken in the direction of arrows substantially along a line II—II of FIG. 1.

Referring to FIGS. 1 and 2, there is shown a first embodiment of a seat slide device 1 for an automotive vehicle according to the present invention.

The seat slide device 1 comprises a seat rail 2 which is generally formed U-shaped in cross-section as shown in FIGS. 1 and 2. A seat 15 is connected to a middle portion of the seat rail 2. Each end portion of the U-shaped seat rail 2 has two projections 3 and 4. A floor rail 5 is generally formed U-shaped in cross-section, and each end portion of the floor rail 5 has guides 6 and 7 at their inner surfaces. An upper bracket 8 is integrally connected to and extends upward from an upper part of the floor rail 5. A lower bracket 9 is integrally connected to and extends downward from a lower portion part of the floor rail 5.

The upper and lower brackets 8 and 9 have a plurality of holes 8a and 9b, respectively, and are fixed to a vehicle body 16 with bolts 11 passing through the holes 8a and 9a. A corner portion 10 of the floor rail 5 is arranged to fit with a corner portion 17 of the vehicle body 16. The seat rail 2 is slidably engaged with the floor rail 5 so as to be movable in the front and aft direction. The projections 3 of the upper and lower side end portions of the seat rail 2 are guided by the guides 6 of the floor rail 5, respectively. Two kinds of bearings 12 and 13 are disposed between the upper end portion of the seat rail 2 and the upper end portion of the floor rail 5 such that the small bearings 13 are surrounded by the projection 4 and the guide 6, and such that the large bearings 12 are surrounded by the projection 3 and the guide 7. Similarly, the large bearings 12 are disposed between the lower end portion of the seat rail 2 and the lower end portion of the floor rail 5 so as to be surrounded by the projections 3 and 4. Accordingly, the seat rail 2 connected to the seat 15 is supported to the floor rail 5 through the bearings 12 and 13 so as to be slidably movable in the front and aft direction.

With the thus arranged seat slide device 1, since the bolts 11 for fixing the floor rail 5 are installed to the brackets 8 and 9 which vertically extend from the upper and lower end portions of the floor rail 5, respectively, so as to be projected from the floor rail 5, the load applied from the seat 15 to the vehicle body 16 is received by a larger area of the vehicle body as compared with a conventional device. This reduces force per area applied to the brackets 8 and 9 and the vehicle body 16. Furthermore, since the seat 15 is easily detached from the vehicle body 16, even if the seat slide device 1 does not operate correctly, the repairing of the seat slide device 1 is easily carried out.

Figure 3:
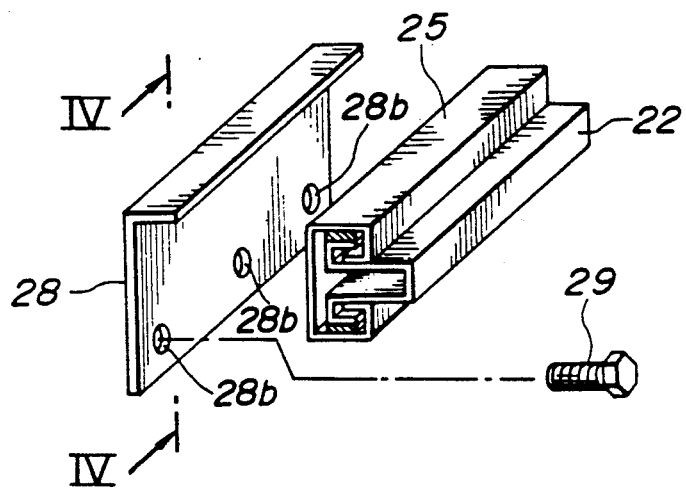
FIG. 3 is a perspective view of a second embodiment of the seat slide device according to the present invention.
Figure 4:
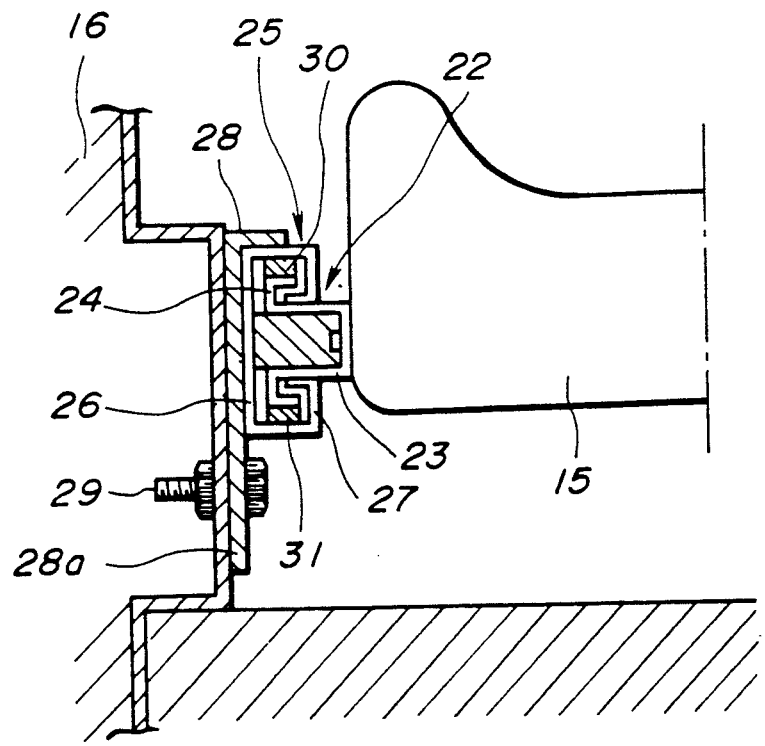
FIG. 4 is a cross-sectional view taken in the direction of arrows substantially along a line IV—IV of FIG. 3.
Figure 5:
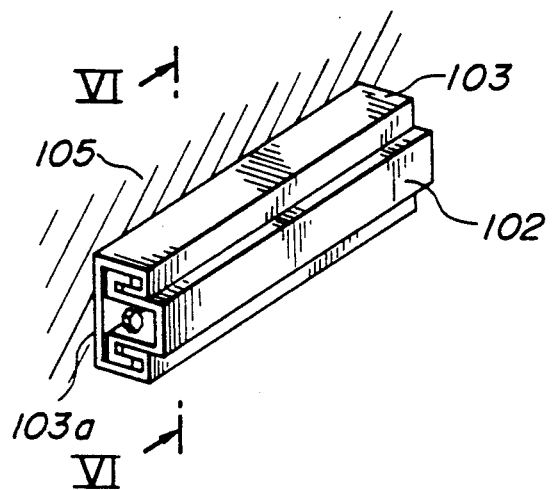
FIG. 5 is a perspective view of a conventional seat slide device.
Figure 6:
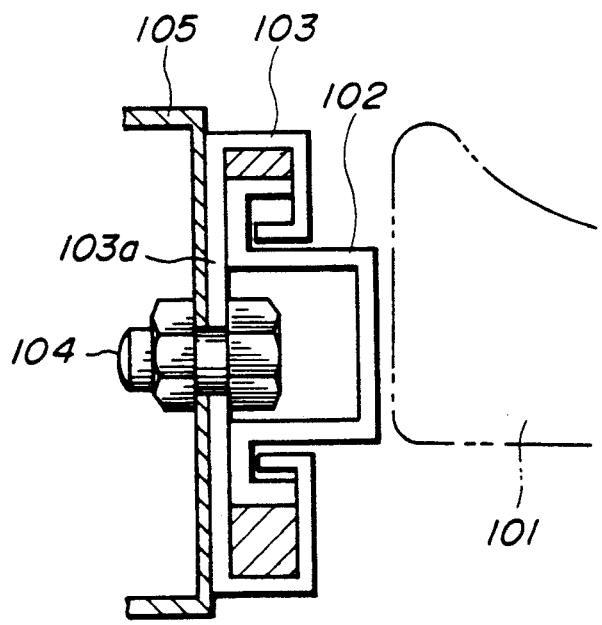
FIG. 6 is a cross-sectional view taken in the direction of arrows substantially along a line VI—VI of FIG. 5.

Referring to FIGS. 3 and 4, there is shown a second embodiment of a seat slide device 20 according to the present invention.

The seat side device 20 comprises a seat rail 22 which is provided with a main body 23 of a generally U-shaped cross-section. Both end portions of the main body 23 are integrally connected to a pair of L-shaped flanges 24, respectively. A bottom surface of a middle portion of the main body 23 is fixed to the seat 15. A floor rail 25 is formed U-shaped in cross-section, and its end portions are connected to L-shaped flanges 27, respectively. A bottom surface of a middle portion of the main body 26 is fixed to a bracket 28 by welding or rivets. The bracket 28 is formed L-shaped in cross-section. One end portion 28a of the bracket 28 extends downward along a surface of the vehicle body 16 and is fixed to the vehicle body 16 with bolts at predetermined intervals. A plurality of holes 28b are formed at the end portion 28a so as to be positioned at the downward side of the floor rail as shown in FIG. 4. A plurality of bolts 29 are screwed to the vehicle body 16 through the holes 28b of the bracket 28 such that the floor rail 25 is fixedly connected to the vehicle body 16 in FIG. 4. The seat rail 22 is slidably engaged with the floor rail 25 to be movable in the front and aft direction. Bearings 30 and 31 are disposed between the seat rail 22 and the floor rail 25, and therefore the seat rail 22 and the seat 15 are supported to the floor rail 25 through the bearings 30 and 31, so as to be movable in the front and aft direction.

With the thus arranged seat slide device 20, the end portion 28a of the bracket 28 is fittingly fixed to the vehicle body 16 and functions as a load bearing member relative to the bending power from the seat 15, so as to stabilize the seat slide device 20. Furthermore, the bolts 29 for fixing the bracket 28 are positioned at the side portion of the floor rail 25 which is uncovered with other parts of this device. Accordingly, it is easy to detach the seat 15 from the vehicle body 16 the seat slide device does not operate properly and requires repair.

What is claimed is:

1. A seat slide device, for an automotive vehicle which supports a seat to be slidably movable in front and aft direction, said seat slide device comprising:

a seat rail connected to the seat;

a floor rail slidably engaged with said seat rail;

bearings disposed between an end portion of said seat rail and an end portion of said floor rail such that the bearings are surrounded by a projection of said seat rail and a guide of said floor rail; and a bracket integrally connected to said floor rail, said bracket vertically extending from said floor rail and being fittingly fixed to a vehicle body of the automotive vehicle.

2. A seat slide device as claimed in claim 1, wherein said bracket includes an upper bracket extending upward from an upper side of said floor rail and a lower bracket extending downward from a lower side of said floor rail.

3. A seat slide device as claimed in claim 1, wherein said bracket has a plurality of holes through which a plurality of bolts are screwed to the vehicle body so as to fixedly connect said floor rail to the vehicle body.

4. A seat slide device for an automotive vehicle which supports a seat to be slidably movable in front and aft direction, said seat slide device comprising:

a seat rail connected to the seat;

a floor rail slidably engaged with said seat rail; and a bracket integrally connected to said floor rail, said bracket vertically extending from said floor rail and being fittingly fixed to a vehicle body of the automotive vehicle, said bracket being formed L-shaped and fixedly connected to said floor rail such that an outside corner portion of said floor rail is fitted to an inner corner portion of said bracket.

5. A seat slide device as claimed in claim 4, wherein said bracket has a plurality holes at its downward extending portion and is connected to the vehicle body through the holes with bolts.

* * * * *